April 3, 1956 — L. G. SIMJIAN — 2,740,325
SYSTEM FOR COMPOSITE PROJECTION
Filed Jan. 23, 1953 — 3 Sheets-Sheet 1

LUTHER G. SIMJIAN
INVENTOR

BY Ralph E. Bitner

ATTORNEY

April 3, 1956     L. G. SIMJIAN     2,740,325
SYSTEM FOR COMPOSITE PROJECTION
Filed Jan. 23, 1953     3 Sheets-Sheet 2

LUTHER G. SIMJIAN
INVENTOR

BY Ralph E. Bitner

ATTORNEY

April 3, 1956  L. G. SIMJIAN  2,740,325
SYSTEM FOR COMPOSITE PROJECTION

Filed Jan. 23, 1953  3 Sheets-Sheet 3

LUTHER G. SIMJIAN
INVENTOR

BY Ralph E. Bitner
ATTORNEY

United States Patent Office 2,740,325
Patented Apr. 3, 1956

2,740,325

SYSTEM FOR COMPOSITE PROJECTION

Luther G. Simjian, Greenwich, Conn., assignor to The Reflectone Corporation, Stamford, Conn., a corporation of Connecticut Application January 23, 1953, Serial No. 332,888

4 Claims. (Cl. 88—24)

This invention relates to a projection system for showing the details of large objects on a projection screen. It has particular reference to an optical system for independently focussing several sections of an object and combining them to form a single picture. The invention also includes a structure which permits an object to be turned so that it can be viewed from various angles while maintaining all of the sections in focus.

The projection of the image of a solid body onto a projection screen is difficult because some of the parts of the object will be out of focus due to varying distances from the lens system. Some attempts have been made to rectify this difficulty by making very small models of the object and then projecting the image of these objects by using a short focal length lens. This method has not proved entirely satisfactory because of the intense illumination required and because the extremeties of even a very small object move out of focus to some extent when the object is turned. The present invention eliminates these difficulties by dividing the object to be viewed into several sections, illuminating each section separately and combining the several pictures on a screen by adjusting a composite lens system. This system has the added advantage of showing normally obscured details since all parts of the several sections can be shown on the screen at one time, thereby increasing the amount of information available for study.

One of the objects of this invention is to provide an improved projection system which avoids one or more of the disadvantages and limitations of prior art arrangements.

Another object of the invention is to provide a projection system which requires a reduced intensity of illumination.

Another object of the invention is to project the image of a large object on a projection screen with all components substantially in focus.

Another object of the invention is to project an image of a large object on a screen showing many of the details and components which would otherwise be masked by intervening portions.

The invention includes several projection lenses which focus light on a single viewing surface. Each lens projects the light from a selected portion of the object which is to be studied. The lenses are arranged to focus the combined sections to form an image of the object. Mechanical means are employed for rotating the several sections and at the same time keeping each section in focus and preserving the object continuity on the the screen.

For a better understanding of the present invention together with other and further objects thereof, reference is made to the following description taken in connection with the accompanying drawings.

Figure 1:
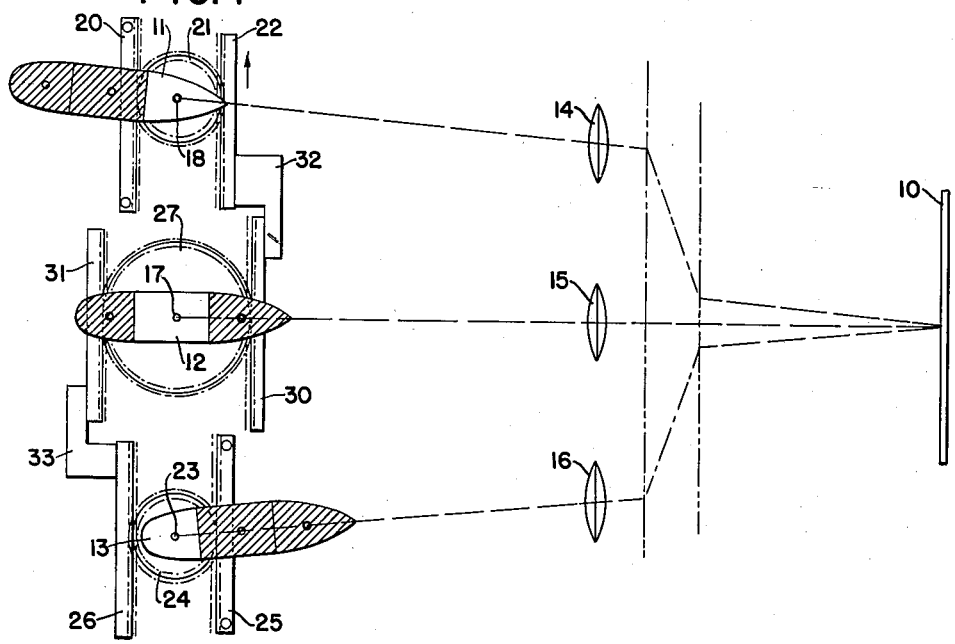
Fig. 1 is a plan view of the projection system showing three boats focussed by three lenses on a single viewing surface.

Referring now to Fig. 1 a viewing screen 10 is mounted at a distance where a projected object may be conveniently studied. Three models of an object 11, 12, and 13 are mounted behind three lenses 14, 15 and 16. In order to show only one-third of the object in each lens system two-thirds of each of the three objects is blacked out by the use of non-reflecting dull black paint. The bow of object 11 is painted in natural colors and illuminated so that the front portion is focussed by lens 14 on screen 10. In a similar manner the central portion of object 12 is arranged for focussing by lens 15 while the remaining two portions are masked with dull non-reflecting paint. Object 13 is similar to the other models in every way except the bow and central sections are masked while the stern is painted in natural colors so that it may be projected by lens 16. The masked portions of the objects are indicated in the drawings by cross-hatching. In this arrangement all three portions which are to be projected on the screen are positioned an equal distance from the lens which is to focus them on the screen. This arrangement permits the lenses 14, 15, and 16 to remain stationary during the rotation of the selected portions.

Each object is pivoted about a pivot point which is placed in the approximate center of the portion to be projected. When the object 12 is turned the central portion is turned about its pivot 17 without transverse movement. The image of this portion, which is not masked by the bow, is always at the central part of the viewing surface 10. Object 11, which in this case is employed to project the bow of a boat, is rotated counter-clockwise about a central point 18 and in addition is moved in a transverse direction in the object plane (vertically upward as shown in Fig. 1). The combination of rotation and transverse movement may be obtained by the use of a variety of mechanical connections or such motion may be realized by the use of an electrical servo-system. Fig. 1 illustrates one of the mechanical arrangements which produces the correct movement. A stationary rack 20 is secured to a base plate (not shown) and meshes with a gear 21 which supports the object 11. Gear 21 also meshes with a slidable rack 22 which is moved in a direction parallel to rack 20. Object 13, which in this case is for the projection of the stern of a boat, is arranged for rotation about a central pivot point 23. This model when turned in a counter-clockwise direction is transversely moved in the object plane in a downward direction as shown in Fig. 1. For this purpose object 13 is supported by a gear 24, similar to gear 21, and this gear meshes with a stationary rack 25 and a slidable rack 26. In order to provide simultaneous movement for all the object models, a gear 27 is secured to object 12 and two moveable racks 30 and 31 mesh with this gear on opposite sides. In addition, the racks 30 and 31 are secured to racks 22 and 26 by couplings 32 and 33. Gear 27 is twice the diameter of gears 21 and 24 so that when the system is moved in a counterclockwise direction the central model 12 turns on its pivot 17 while the model 11 is given a rolling motion, turning and moving up at the same time. Model 13 also turns in a counter-clockwise direction rolling along rack 25 and therefore moving down while being rotated.

The composite picture, shown on screen 10, of objects 11, 12, and 13 is the same as that of a single non-masked object except that substantially all parts of the projected picture are in focus. In Fig. 1, the bow portion of object 12 masks a considerable area of the midsection of the objects but those parts, such as masts, bridge, and superstructure, which extend above the bow will be visible.

Figure 2:
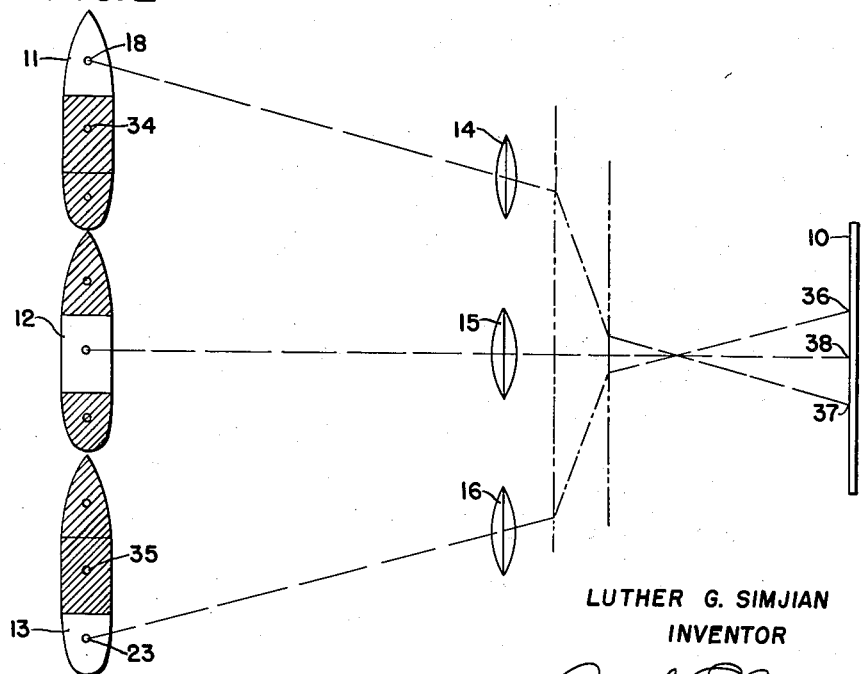
Fig. 2 is a plan view similar to Fig. 1 but with the boats turned at right angles and moved transversely to the optical axis to maintain an integral object on the screen.

At the end of a 90° rotation the three models appear in the position as shown in Fig. 2 retained in angular alignment, object 11 having been moved so that its pivot point 18 is now in a new position, having been transversely shifted from a point 34 which is now occupied by the center of the model. In a similar manner object 13 has been rotated and moved downwardly so that its center point 23 is in a new position, having been shifted from its previous position which is now occupied by the center 35 of the model 13. It will be obvious that during the rotation of the three models the projected image on the viewing surface 10 will show a composite picture of one side of the model, this composite picture being formed by the stern projected to position 36 on surface 10, the bow which is projected to a point 37 on surface 10 and the central portion of the object which is projected to position 38. It will also be obvious that a rotation in a clockwise direction will move the bow part of 11 in a downward direction and the stern part of 13 in an upward direction to show a composite picture of the left side of the boat on viewing surface 10.

The models shown in Figs. 1 and 2 are complete models, each having all the components which are to be viewed in the projected picture. As indicated in Fig. 1 the bow of 11 will be projected without any of its details being masked or cut off by components in the other portions. However, object 12 may have a large portion of its detailed components masked by the bow portion of the model which in this case has been painted with a non-reflecting coating. In a similar manner the stern portion may be entirely obscured by the other two portions of the model when the models have been rotated to the position shown in Fig. 1.

It may be desirable to show details of all portions of an object model even though these details would normally be obscured in a photograph or when viewing the object at a distance. For this purpose the arrangements shown in Figs. 3, 4, 5, and 6 are employed and only portions of a model are used.

Figure 3:
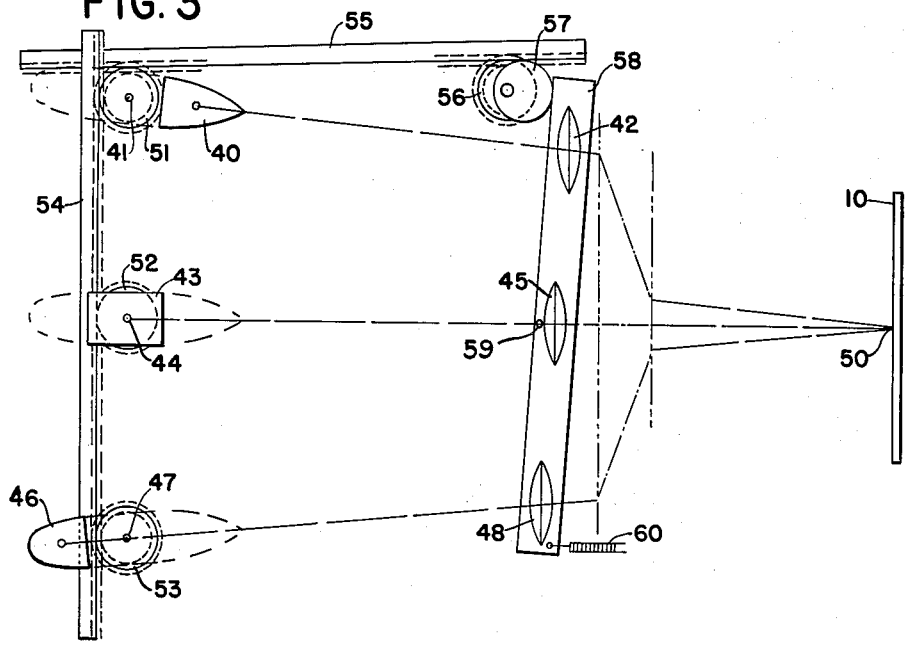
Fig. 3 is a plan view showing three portions of an object arranged at different distances from the lens system with the position of the lenses adjusted so as to bring all portions in focus on the screen.
Figure 4:
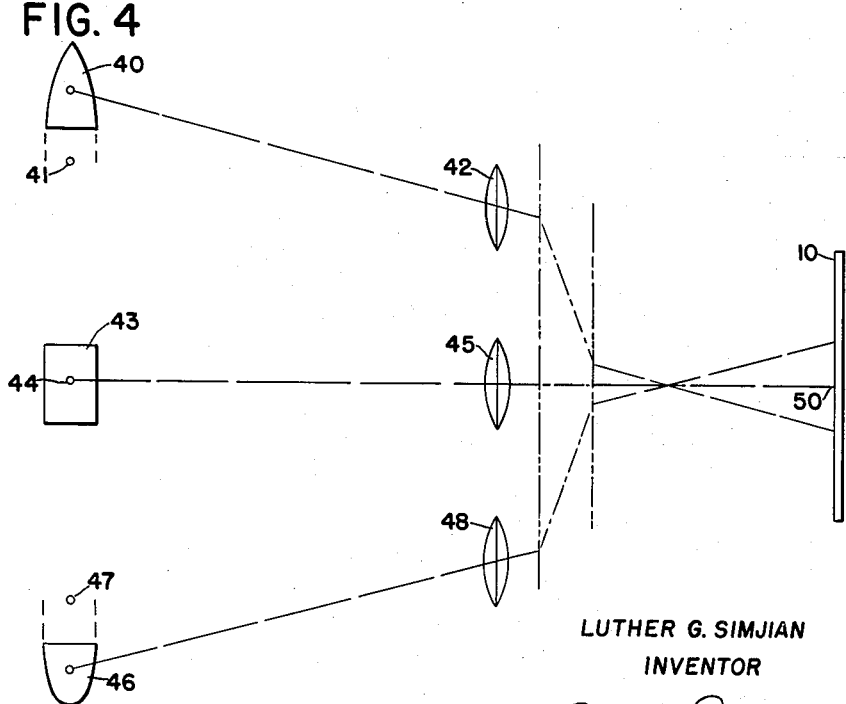
Fig. 4 is a plan view of the system shown in Fig. 3 with the portions turned at right angles about the center of the object with the lens distance adjusted to preserve focus.

Referring now to Figs. 3 and 4 a selected portion 40 of an object model is mounted on a pivot point 41 and arranged for rotation about that point. This portion is focussed by a lens 42 onto a viewing surface 10. A second portion 43 is positioned as indicated and arranged for rotation about a pivot point 44. This portion of the model is focussed by a lens 45. In a similar manner a third portion 46 of the model is arranged for rotation about a pivot point 47 and is focussed by lens 48 the combined images being merged at position 50 on surface 10 to form a composite image of the model which will show not only the details which would normally be seen by the eye but also many other details which would normally be obscured. This type of projection therefore produces a new result which is valuable for training programs and laboratory study.

The rotary movement of portions 40 and 46 around their pivotal points results in a varying distance between the central part of each portion and the lenses 42 and 48.

For this reason it is necessary to provide a continuously variable focussing arrangement which will provide a focussed image on the viewing surface 10 regardless of the movement of the portions toward or away from the lens position. Such an arrangement may be conveniently obtained by mounting each portion on a gear 51, 52, and 53 as indicated in the drawing. These gears all mesh with a rack 54 and one of the gears also meshes with a focussing rack 55. The focussing rack is coupled to a focussing gear 56 on which is mounted a cam 57. This cam moves a lens mounting bar 58, pivoted at 59, to keep all the lenses in focus. A spring 60 is employed to keep the bar 58 in contact with the cam surface of cam 57. A cam is necessary for such movement because the focussing position of a lens does not generally bear a linear relationship with a circular motion of an object. After the rotation of the portion shown in Fig. 3 has resulted in a 90° counter-clockwise turn the relative position of the portions and the lenses is illustrated by Fig. 4.

Figure 5:
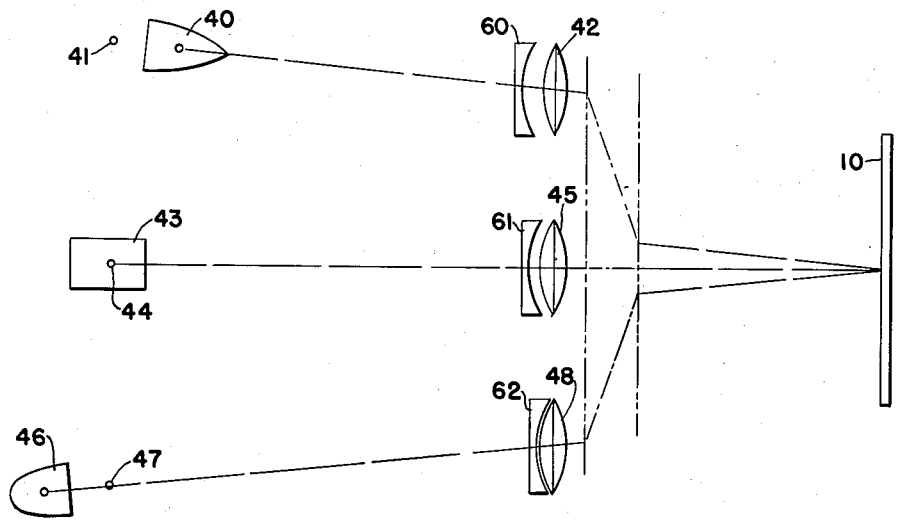
Fig. 5 is a plan view similar to Fig. 3 but employing lenses which are adjusted for focus by varying the relative position of lens components.
Figure 6:
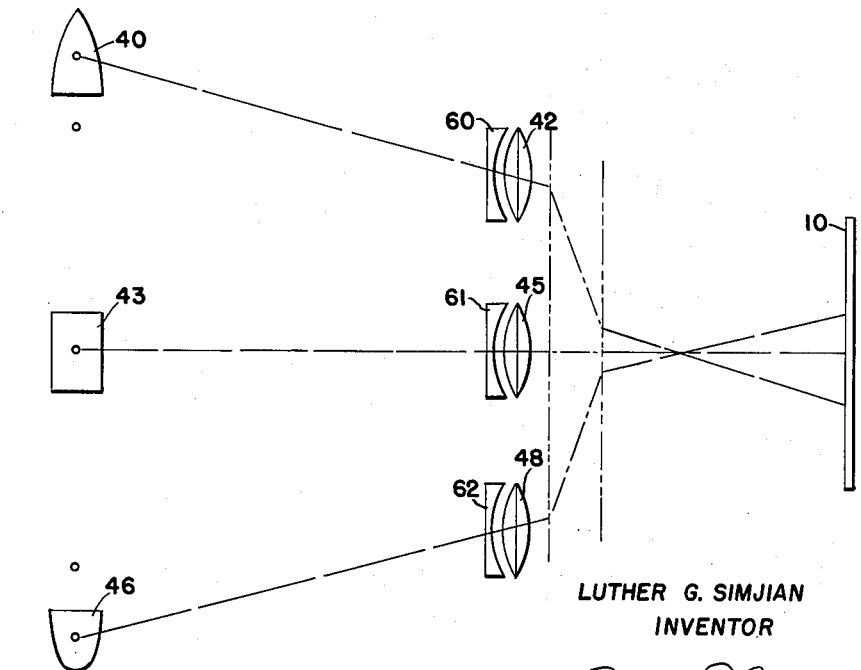
Fig. 6 is a view similar to Fig. 5 but showing the portions of the object turned at an angle of 90° with a lens adjustment to maintain a focussed image on the screen.

It is not necessary to move the entire lens system in order to focus it and Figs. 5 and 6 show a schematic arrangement indicating the method of maintaining a focus on a viewing surface by moving only one component of a lens system. Figs. 5 and 6 generally correspond to Figs. 3 and 4 and show portions 40, 43, and 46 turning about pivots 41, 44, and 47. The lens systems are schematically illustrated and comprise positive lenses 42, 45, and 48 which are immovably secured to a base and negative components 60, 61, and 62 which can be moved by a cam arrangement similar to that shown in Fig. 3. When the model portions have been moved through a right angle turn their position is indicated by Fig. 6 and the three lens adjustments are substantially the same.

While there have been described and illustrated specific embodiments of the invention, it will be obvious that various changes and modifications may be made therein without departing from the field of the invention which should be limited only by the scope of the appended claims.

I claim:

1. A projection system for showing the composite picture of a plurality of objects comprising, a plurality of movable relief objects, each of said objects having a light reflecting portion which is adapted to become a part of said composite picture; a plurality of lenses, each associated with one object, focussing light from said reflecting portion to a viewing surface; said plurality of lenses adapted to produce a composite picture of the light reflecting portions, and mounting means which rotate the objects simultaneously about an axis at right angles to their projection axes while retaining the angular alignment of said objects.

2. A projection system in accordance with claim 1 wherein said mounting means are coupled together by mechanical means.

3. A projection system in accordance with claim 2 wherein said mechanical means is arranged to move some of said objects transversely during rotation.

4. A projection system in accordance with claim 1 wherein each object includes a reflective coating on some areas and a non-reflecting coating on other areas.

References Cited in the file of this patent

UNITED STATES PATENTS

| | | |
|---|---|---|
| 1,318,348 | Bingham | Oct. 14, 1919 |
| 1,692,364 | Akemann | Nov. 20, 1928 |
| 2,085,400 | Tomozawa | June 29, 1937 |
| 2,600,261 | Pennington | June 10, 1952 |
| 2,610,544 | Waller et al. | Sept. 16, 1952 |

FOREIGN PATENTS

| | | |
|---|---|---|
| 543,739 | Germany | Feb. 10, 1932 |